(12) United States Patent
Wang

(10) Patent No.: US 6,326,775 B1
(45) Date of Patent: Dec. 4, 2001

(54) FAST DC DISCHARGE DEVICE

(75) Inventor: Simon Wang, Taipei (TW)

(73) Assignee: Chroma ATE Inc., Taipei Hsien (TW)

( * ) Notice: Subject to any disclaimer, the term of this patent is extended or adjusted under 35 U.S.C. 154(b) by 0 days.

(21) Appl. No.: 09/680,813

(22) Filed: Oct. 5, 2000

(51) Int. Cl.$^7$ ...................................................... G05F 1/40
(52) U.S. Cl. ............................................ 323/288; 323/364
(58) Field of Search ........................ 363/21.04; 323/288, 323/364, 355

(56) References Cited

U.S. PATENT DOCUMENTS 5,548,501 * 8/1996 Chen ...................................... 363/40

* cited by examiner

Primary Examiner—Shawn Riley
(74) Attorney, Agent, or Firm—Bucknam and Archer

(57) ABSTRACT

A fast DC discharge device for a large rated capacity, includes a capacitor (C1), a switch (SW2) serially connected to capacitor (C1), a high voltage transformer (T1), an amplifier (AMP1) connected to the primary coil of high voltage transformer (T1), a switch (SW1) connected between high. voltage transformer (T1) and switch (SW2), a diode (D1) connected in parallel to switch (SW1), and an inductance connected between the secondary coil of high voltage transformer (T1) and switch (SW1), for reducing the instant current during the early stage of discharging, and for protecting switch (SW1) from failure caused by multiple discharges over a long period of time, and a switch (SW3) connected between the output of the amplifier (AMP1) and the primary coil of the high voltage transformer (T1), which is an open circuit during the discharge cycle, so that the transformer (T1) will show an inductive characteristic during the discharge cycle. Resistance (R3) is arranged in parallel with capacitor (C1). After measurement of DC current, switch (SW2) is turned off and switch (SW1) is turned on, so that the output side presents a zero-potential state but charges in capacitor (C1) continue to discharge via resistance R3, thus a long time operation for switch (SW1) is ensured.

2 Claims, 2 Drawing Sheets

US 6,326,775 B1

FAST DC DISCHARGE DEVICE

FIELD OF THE INVENTION

The present invention relates to a fast DC discharge device.

BACKGROUND OF THE INVENTION

In the prior art, when a high voltage transformer is used to perform fast discharge, though. in principle a high voltage transformer is an inductive load, because the following two reasons it does not present the inductive load effect which should be shown in the original fast discharge.

Referring to FIG. 1, a high voltage transformer increases a voltage of about low voltage (25V) to 200 times to achieve a high voltage output. Therefore the number of turns in its secondary coil is very high, which theoretically will result in an equivalent characteristic of a inductance to be an inductance connected in parallel with a capacitor. This is the first reason.

Referring to FIG. 2, though in principle a high voltage transformer has an inductive characteristic, when one side of the transformer is short-circuited, the inductive characteristic will become a quasi short circuit state. This is the second reason.

Referring to FIG. 3, conventional principle of fast DC discharge uses SW1 to allow charge on C1 to flow via SW1 to T1 to achieve the purpose of fast discharge. This is correct theoretically. However, in practical usage, failure of switch SW1 occurs after continuous long-term operation due to the above two reasons, so that fast discharge theory is not suitable for continuous long-term on/off operation of fast DC discharge.

SUMMARY OF THE INVENTION

An object of the present invention is to overcome the above problem which arises in conventional fast DC discharge due to its practical inductive characteristic and to prevent failure of switch SW1 used in the discharge thus increasing the life of said switch.

DETAILED DESCRIPTION OF THE INVENTION

First Embodiment

Figure 4:
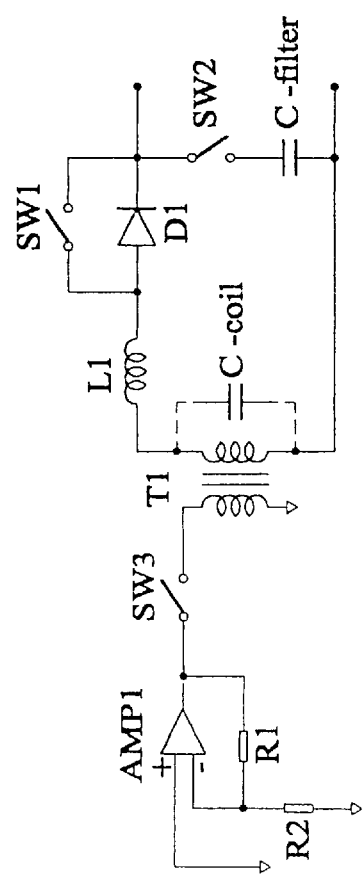
FIG. 4 is a circuit diagram showing an embodiment of the present invention used in a large rated capacity application.

This embodiment is an application for a large rated capacity. Referring to FIG. 4, there is described an improved device according to the present invention for solving problems of the prior technique.

As can be seen in FIG. 4, since the existence of C-coil described above, there will be a large instant current according to the prior technique. In the present invention, L1 is added to the original circuit so that the instant current has been reduced. Therefore, it is possible to prevent SW1 from failure caused by multiple discharges over a long period of time.

Next, because the primary coil of the prior high voltage transformer is directly connected to the output of an amplifier (AMP), and the impedance of the output on the amplifier is zero ohm, i.e. it is short-circuited as seen from the right side of T1. Therefore, the present invention adds SW3 between the amplifier and T1 and leaves SW1 open during the discharge cycle to enable the inductive characteristic of T1 while discharging.

Second Embodiment

Figure 1:
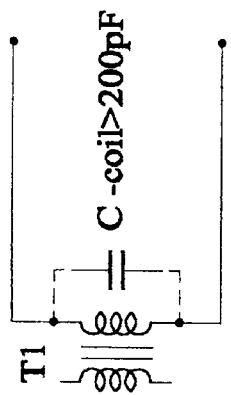
FIG. 1 shows the effect of a parallel capacitor which exists in the inductance of a high voltage transformer.
Figure 3:
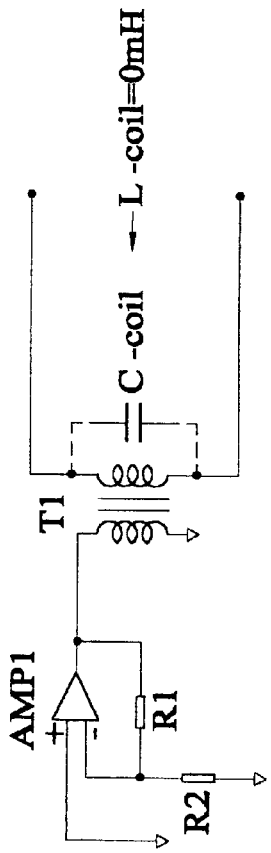
FIG. 3 shows the principle of a conventional fast DC discharge device.
Figure 2:
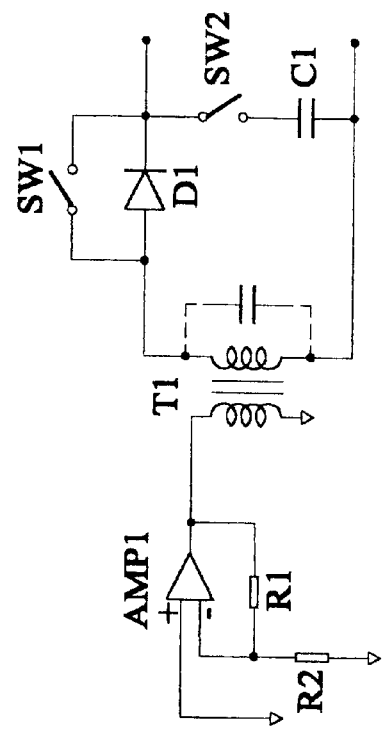
FIG. 2 shows the characteristic of the inductance becoming a quasi short circuit state upon short-circuit at one side of the high voltage transformer.
Figure 5:
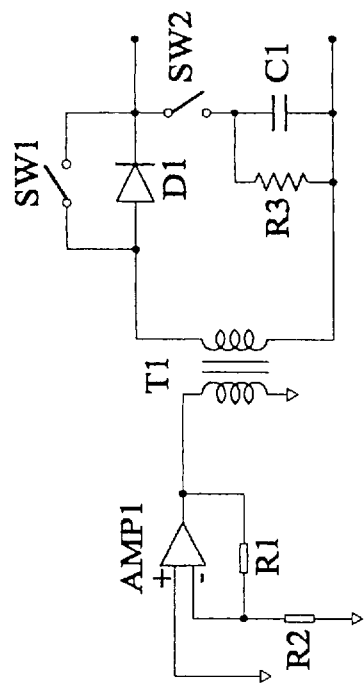
FIG. 5 is a circuit diagram showing an embodiment of the present invention used a small rated capacity application.

This embodiment is an application for a small rated capacity. Referring to FIG. 5, this embodiment differs from the prior art (FIG. 3) by having R3 connected in parallel with C1. Leaving SW2 open after the measurement of DC current and then turn on SW1 to present zero potential state at the output side but with charges in C1 continue to discharge via R3. Thus, it is assured that SW1 may continuously conduct similar discharge operation for a very long time without being damaged. Since SW2 is open and showing zero potential, so that the object to be measured is allowed to move freely, and by the time the next object to be measured is brought into contact, charges in C1 has achieved the discharge goal due to continue discharge conducted by R3.

The above device and principle result in a charge/discharge operation of more than 5 million times which is not possible in the prior art.

| SYMBOL LISTS | |
|---|---|
| T1 | high voltage transformer |
| SW1, SW2, SW3 | switches |
| C1 | capacitor |
| D1 | diode |
| L1 | inductance |
| AMP1 | amplifier |
| R1, R2, R3 | resistance |

What is claimed is:

1. A improved fast DC discharge device for a large rated capacity, comprising: a capacitor (C1); a switch (SW2) serially connected to said capacitor (C1); a high voltage transformer (T1); an amplifier (AMP1) connected to the primary coil of said high voltage transformer (T1); a switch (SW1) connected between said high voltage transformer (T1) and said switch (SW2); a diode (D1) parallel connected to said switch (SW1); and an inductance connected between the secondary coil of said high voltage transformer (T1) and switch (SW1), for reducing the instant current during the early stage of discharging, further for protecting switch (SW1) from failure caused by multiple discharges in a long period of time; and a switch (SW3) connected between the output of the amplifier (AMP1) and the primary coil of the high voltage transformer (T1), which is left open during the discharge cycle, so that the transformer (T1) will show an inductive characteristic during the discharge cycle.

2. A fast DC discharge device for a small rated capacity, comprising: a capacitor (C1); a switch (SW2) serially connected to said capacitor (C1); a high voltage transformer (T1); an amplifier (AMP1) connected to the primary coil of said high voltage transformer (T1); a switch (SW1) connected between said high voltage transformer (T1) and said switch (SW2); a diode (D1) parallel connected to said switch (SW1); characterized in that: resistance R3 is arranged in parallel connection with capacitor (C1), and turn off the switch (SW2) and turn on the switch (SW1) after measurement of DC current, so that the output side presents a zero-potential state but charges in capacitor (C1) continue to discharge via resistance R3, thus a long time operation for switch (SW1) can be ensured.

* * * * *